United States Patent [19]

Garman

[11] Patent Number: 5,110,244

[45] Date of Patent: May 5, 1992

[54] FASTENER ASSEMBLY

[75] Inventor: James A. Garman, Eureka, Ill.

[73] Assignee: Caterpillar Inc., Peoria, Ill.

[21] Appl. No.: 750,340

[22] Filed: Aug. 27, 1991

[51] Int. Cl.⁵ ............... F16B 19/00; B21D 39/00
[52] U.S. Cl. .............................. 411/361; 411/354; 29/520; 29/525.2
[58] Field of Search ................. 411/34–38, 411/43, 361, 354; 29/517, 518, 520, 525.2, 525.1; 403/371

[56] References Cited

U.S. PATENT DOCUMENTS

| | | | |
|---|---|---|---|
| 3,139,787 | 7/1964 | Bochman, Jr. | 411/361 |
| 3,937,123 | 2/1976 | Matuschek et al. | |
| 4,475,859 | 10/1984 | Oliver | 411/361 |
| 4,482,174 | 11/1984 | Puri | 29/520 |
| 4,531,871 | 7/1985 | Sigmund | 411/361 |
| 4,598,938 | 7/1986 | Boss et al. | 29/520 |
| 4,639,995 | 2/1987 | Garman et al. | 29/402.08 |

FOREIGN PATENT DOCUMENTS 2262160 6/1973 Fed. Rep. of Germany ...... 411/361

OTHER PUBLICATIONS

U.S. application No. 07/580,390, filed Sep. 10, 1990, by James A. Garman, (drawings only).

Primary Examiner—Neill R. Wilson
Attorney, Agent, or Firm—J. W. Burrows

[57] ABSTRACT

Fasteners, such as bolts, are normally utilized to provide an arrangement to secure two members together. When working forces are applied to the assembled members trying to tear them apart, the size of the bolts and the ability to apply the proper torque to the bolts on the job site become limitations. In the subject arrangement, a fastener assembly is provided having a hollow cylindrical pin with an enlarged portion at one end and a plurality of ridges and grooves at the other end. A hollow cylindrical shear ring, having a chevron shaped cross-section taken along its longitudinal axis, is placed, during assembly, in intimate contact with the plurality of ridges and grooves. A hollow cylindrical compression ring is placed, during assembly, in contact with the hollow cylindrical shear ring. Upon application of an external force, the hollow cylindrical compression ring is forced over the hollow cylindrical shear ring causing the material of the hollow cylindrical shear ring to flow around the plurality of ridges and into the plurality of grooves to provide a positive retainer. The subject arrangement can be easily assembled and disassembled at the job site by use of a hydraulic tool assembly.

14 Claims, 4 Drawing Sheets

FASTENER ASSEMBLY

TECHNICAL FIELD

This invention relates generally to a fastener assembly adapted for connecting two members together and more specifically to a fastener having high retaining characteristics.

BACKGROUND ART

Various forms of fasteners have been used in the past to connect several members together. In many situations, bolts have been successfully used. However, as the separating forces become greater due to the increasing sizes of equipment, such as construction equipment, bolt sizes and the ability to properly tension the bolts become limitations. If it is only necessary to hold two or more pieces together without the need of applying tension to the retainer pin, a solid pin may be used and secured by a formed-in-place retainer. An example of such an arrangement is illustrated in U.S. Pat. No. 4,639,995 issued Feb. 3, 1987 by J. A. Garman et al.

Another arrangement for securing two or more members together is illustrated in U.S. Pat. No. 3,937,123 issued Feb. 10, 1976 by J. Matuschek. This arrangement provides the ability to apply a predetermined preload to the assembly and allows the securing of the two members to be accomplished while having access to only one side of the assembly. However, once assembled it appears to be very difficult to easily disassemble.

It is desirable to provide a fastener assembly that not only provides very high retaining forces and can be easily assembled at the job site but can also be easily disassembled at the job site using the same type of service tooling.

The present invention is directed to overcoming one or more of the problems as set forth above.

DISCLOSURE OF THE INVENTION

In one aspect of the present invention a fastener assembly is provided and adapted to secure an adapter to a base edge of a bucket. The fastener assembly includes a hollow cylindrical pin having an enlarged portion at one end and a plurality of circumferential ridges and grooves at the other end thereof each being longitudinally adjacent each other. The hollow cylindrical pin, when assembled, is disposed through respective holes in the base edge and the adapter. A hollow cylindrical shear ring is provided and operative, when assembled, to fit around the circumferential ridges and grooves adjacent the other end of the hollow cylindrical pin. The assembly also includes a hollow cylindrical compression ring operative, during assembly, in response to an external force axially applied to the compression ring, to radially compress the hollow cylindrical shear ring so that the material of the hollow cylindrical shear ring is forced to flow around the plurality of circumferential ridges and into the plurality of circumferential grooves.

In another aspect of the present invention a method is provided for applying a preload force to a fastener assembly when fastening two or more members together. The method for applying a preload force includes the following steps. A hollow cylindrical pin having an enlarged portion at one end and a plurality of circumferential ridges and grooves at the other end thereof is inserted through corresponding openings of the members being secured until the enlarged portion abuts one of the members. A hollow cylindrical shear ring, having a cross-section taken parallel to the axis thereof of a chevron shape, is placed around the hollow cylindrical pin to the position abutting another of the members being secured. A hollow cylindrical compression ring having a inner surface with a beveled leading edge is positioned in contact with the chevron shaped hollow cylindrical shear ring. The enlarged end of the hollow cylindrical pin is held in intimate contact with the one member of the members being secured. An external force is applied to the hollow cylindrical compression ring in opposition to the force holding the hollow cylindrical pin in abutment with the one member. The hollow cylindrical compression ring is progressively forced axially around the chevron shaped hollow cylindrical shear ring to progressively force the material of the hollow cylindrical shear ring radially around the ridges and into the grooves of the plurality of circumferential ridges and grooves of the hollow cylindrical pin and to progressively flatten the chevron shaped hollow cylindrical shear ring thus progressively tensioning the hollow cylindrical pin responsive to the flattening of the chevron shaped hollow cylindrical shear ring.

The present invention provides a simple fastener assembly which has high retaining characteristics and provides the ability to assemble and disassemble the fastener assembly at the job site.

BEST MODE FOR CARRYING OUT THE INVENTION

Figure 1:
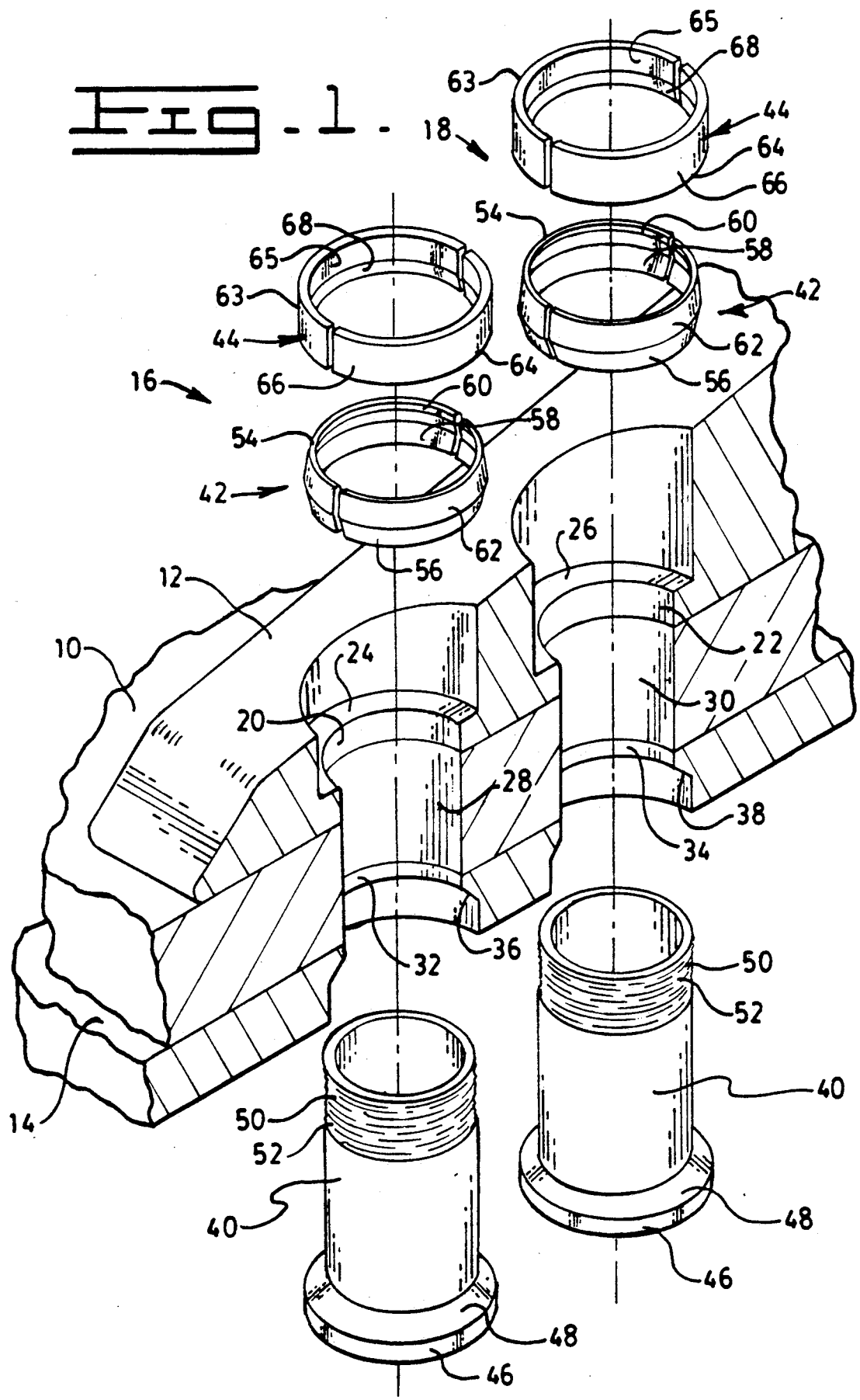
FIG. 1 is an isometric drawing representing the individual components of an embodiment of the present invention.

Referring to the drawings, and more particularly to FIG. 1, a portion of a base edge 10 of a bucket (not shown), a portion of an adapter 12 and a portion of a wear plate 14 are illustrated. Also illustrated, in an unassembled spaced apart condition, are identical first and second compression retained fasteners assemblies 16,18. These fasteners assemblies 16,18 are operative to secure the adapter 12 and the wear plate 14 to the base edge 10. The adapter 12 defines first and second openings 20,22 spaced from one another. Each of the openings 20,22 are counterbored to establish respective shoulders 24,26. The base edge 10 defines spaced apart first and second openings 28,30. The wear plate 14 defines respective spaced apart first and second openings 32,34 and each of the openings 32,34 are counterbored to establish respective shoulders 36,38. When assembled, the first opening 20 in the adapter 12, the first opening 28 in the base plate 20, and the first opening 32 in the wear plate 14 are in axial alignment. Likewise, when assembled, the second opening 22 in the adapter 12, the second opening 30 in the base edge 10, and the second opening 34 in the wear plate 14, are in axial alignment.

Since both the first and second fastener assemblies 16,18 are identical, any comments relative to one of the fastener assemblies will be applicable to and have the same meaning with respect to the other of the fastener assemblies.

Each of the fastener assemblies 16,18, include a hollow cylindrical pin 40, a hollow cylindrical shear ring 42, and a hollow cylindrical compression ring 44. The hollow cylindrical pin has an enlarged portion 46 at one end thereof which is effective to form a shoulder 48. A plurality of circumferential ridges and grooves 50,52 are defined on the hollow cylindrical pin 40 at the other end thereof. The plurality of circumferential ridges and grooves 50,52 are located adjacent one another in the direction of the longitudinal axis of the hollow cylindrical pin 40. It is recognized that the plurality of ridges and grooves 50,52 could be replaced with ridges and grooves of various forms, such as, by a thread being machined on the other end of the hollow cylindrical pin 40, without departing from the essence of the invention. The hollow cylindrical pin 40 is of a size sufficient to mate with the corresponding openings 20,28,32 in the adapter 12, the base edge 10 and the wear plate 14.

The hollow cylindrical shear ring 42 has a cross-section taken parallel to the axis thereof that is chevron shaped. The hollow cylindrical shear ring 42 is made up of two substantially half shells 54,56. The hollow cylindrical shear ring 42 defines an inner surface 58 with a beveled edge 60 on the trailing end thereof and also defines an outer surface 62. It is recognized that the beveled trailing edge 60 could be eliminated without departing from the essence of the invention. The material of the hollow cylindrical shear ring 42 is a softer, less dense material than that of the hollow cylindrical pin 40. More specifically, the material of the subject hollow cylindrical shear ring 42 is an aluminum alloy.

The hollow cylindrical compression ring 44 is composed of two substantially half shells 63,64 and defines an inner surface 65 and an outer surface 66. The inner surface 65 of the hollow cylindrical compression ring has a beveled edge 68 on the leading end thereof. It is recognized that the hollow cylindrical compression ring 44 could be a one piece design instead of two half shells.

Figure 2:
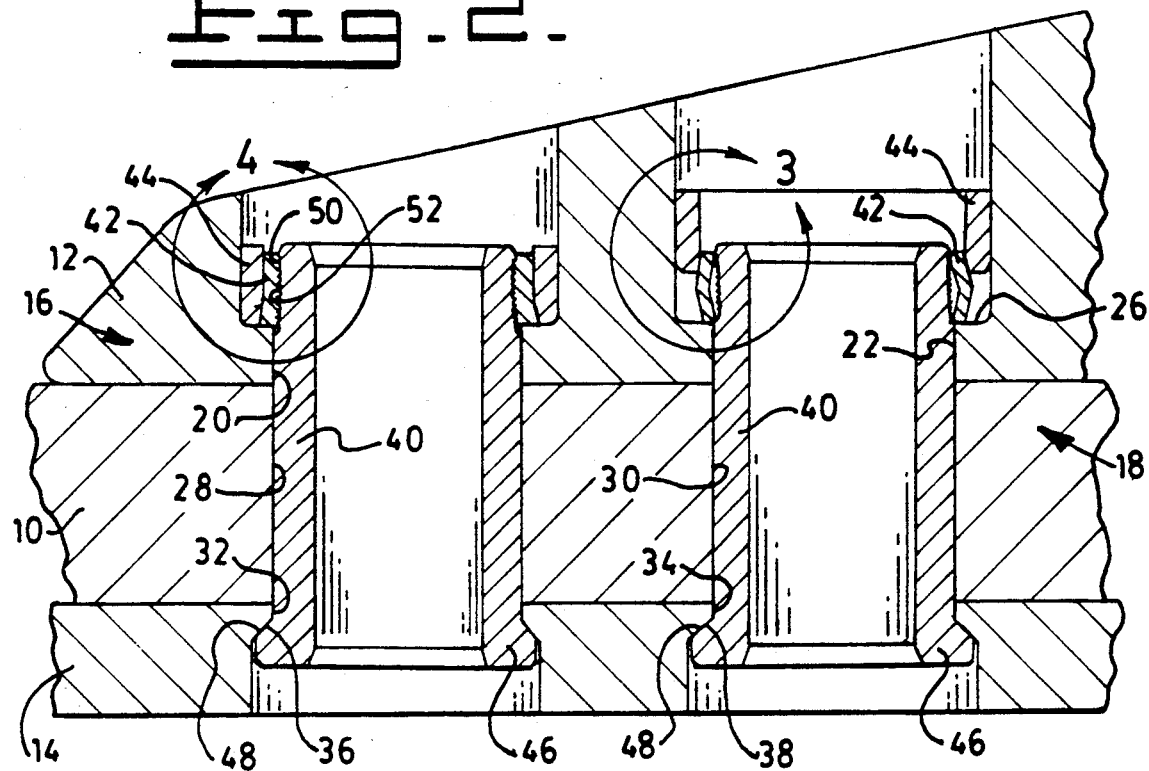
FIG. 2 is a cross-sectional view of the embodiment set forth in FIG. 1 illustrating a fastener assembly being positioned for final installation and a fastener assembly completely assembled.
Figure 3:
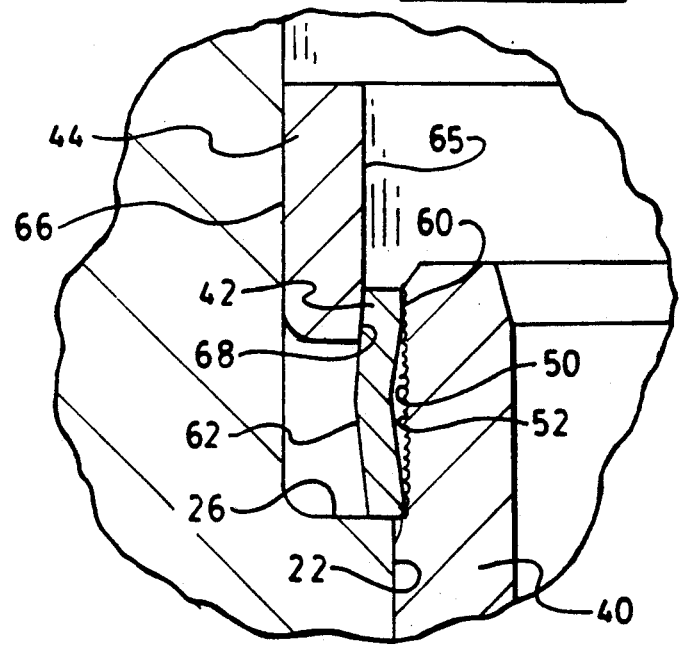
FIG. 3 is an enlarged sectional view of a portion of the fastener assembly taken from the fastener assembly of FIG. 2 that is being positioned for final installation.
Figure 4:
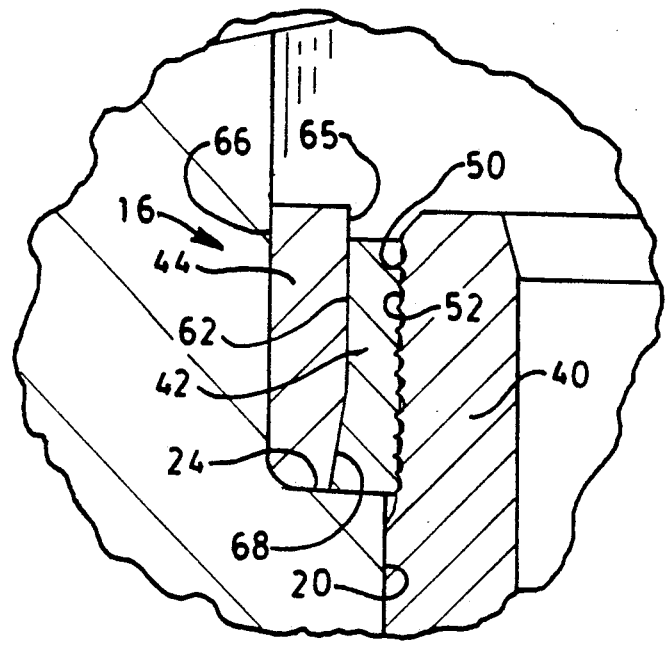
FIG. 4 is an enlarged sectional view of a portion of the fastener assembly taken from the fastener assembly of FIG. 2 that is fully assembled.

Referring now to FIGS. 2, 3, and 4, the first fastener assembly 16 is shown in a fully assembled condition while the second fastener assembly 18 is shown in the condition just prior to applying an external force to the hollow cylindrical compression ring 44 forcing it into the final assembled position. From a review of the pre-assembled positions of the various components of the second fastener assembly 18, it is noted that the shoulder 48 of the hollow cylindrical pin 42 is in abutment with the shoulder 38 of the second opening 34 in the wear plate 14. Furthermore, the first and second substantially half shells 54,56 of the hollow cylindrical shear ring 42 are placed in the counterbore of the second opening 22 in the adapter 12 such that one end thereof is in abutment with the shoulder 26 in the second opening 22 while the beveled trailing edge 60 thereof is located adjacent the other end of the hollow cylindrical pin 40 and is in intimate contact with a portion of the plurality of ridges 50 and grooves 52. The beveled leading edge 68 of the inner surface 65 defined in the hollow cylindrical compression ring 44 is in contact with a portion of the outer surface 62 adjacent one end of the hollow cylindrical shear ring 42.

In the subject embodiment, the hollow cylindrical compression ring 44 is two substantially half shells 63,64 but it is recognized that it could be one piece with a diameter that is sufficient to provide a sliding fit in the counterbore of the respective first and second openings 20,22 in the adapter 12. With reference to the fully assembled first fastener assembly 16, it is noted that the hollow cylindrical compression ring 44 has been forced into its fully assembled position which results in the material of the hollow cylindrical shear ring 42 being forced to flow around the plurality of ridges 50 and into the plurality of grooves 52 of the hollow cylindrical pin 40. FIGS. 3 and 4 are enlarged in order to better illustrate the noted relationships set forth above.

Figure 5:
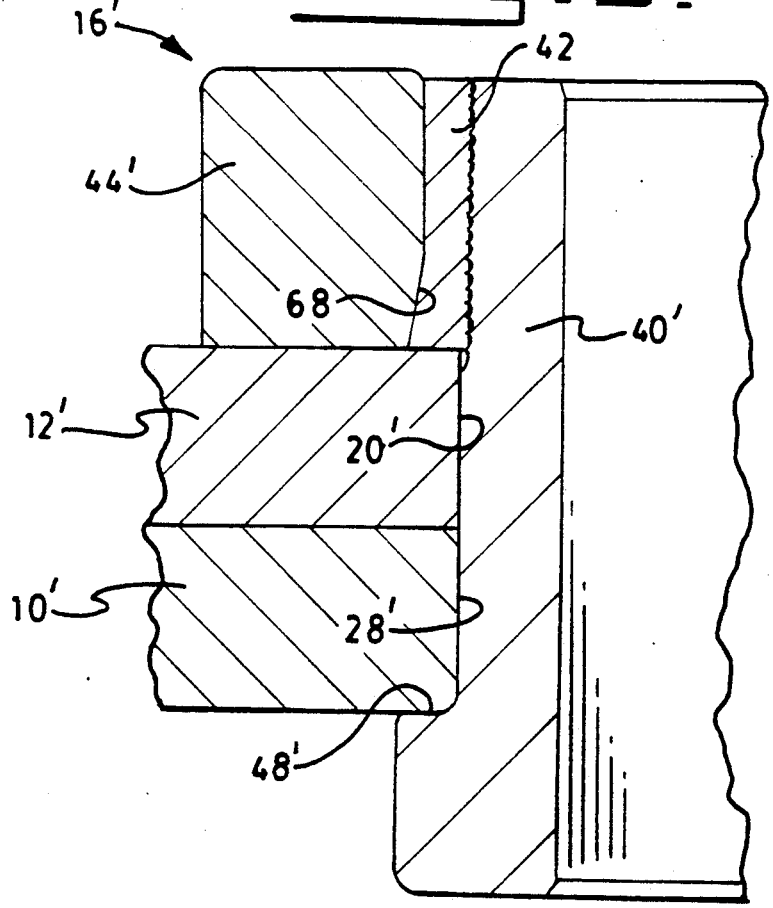
FIG. 5 is a partial sectional view of another embodiment of the present invention.

Referring now to FIG. 5, another embodiment of the subject invention is set forth. The primary difference of the additional embodiment is that the hollow cylindrical compression ring 44 set forth in the previous figures has been modified. The modified hollow cylindrical compression ring 44' has a larger diameter in order to provide the necessary strength to resist radial growth when it is not utilized in a counterbored hole. Otherwise, the function and characteristics are the same as that for the hollow cylindrical compression ring 44 set forth above. Furthermore, there are only two members 10',12' being secured as opposed to three members being secured as illustrated in the previous embodiment. The hollow cylindrical pin 40' is located in the openings 20',28' that are not counterbored. It should be recognized that two or more members may be secured at one time without departing from the essence of the invention and the two or more members may be members other than the adapter 12, the base edge 10, or the wear plate 14.

Figure 6:
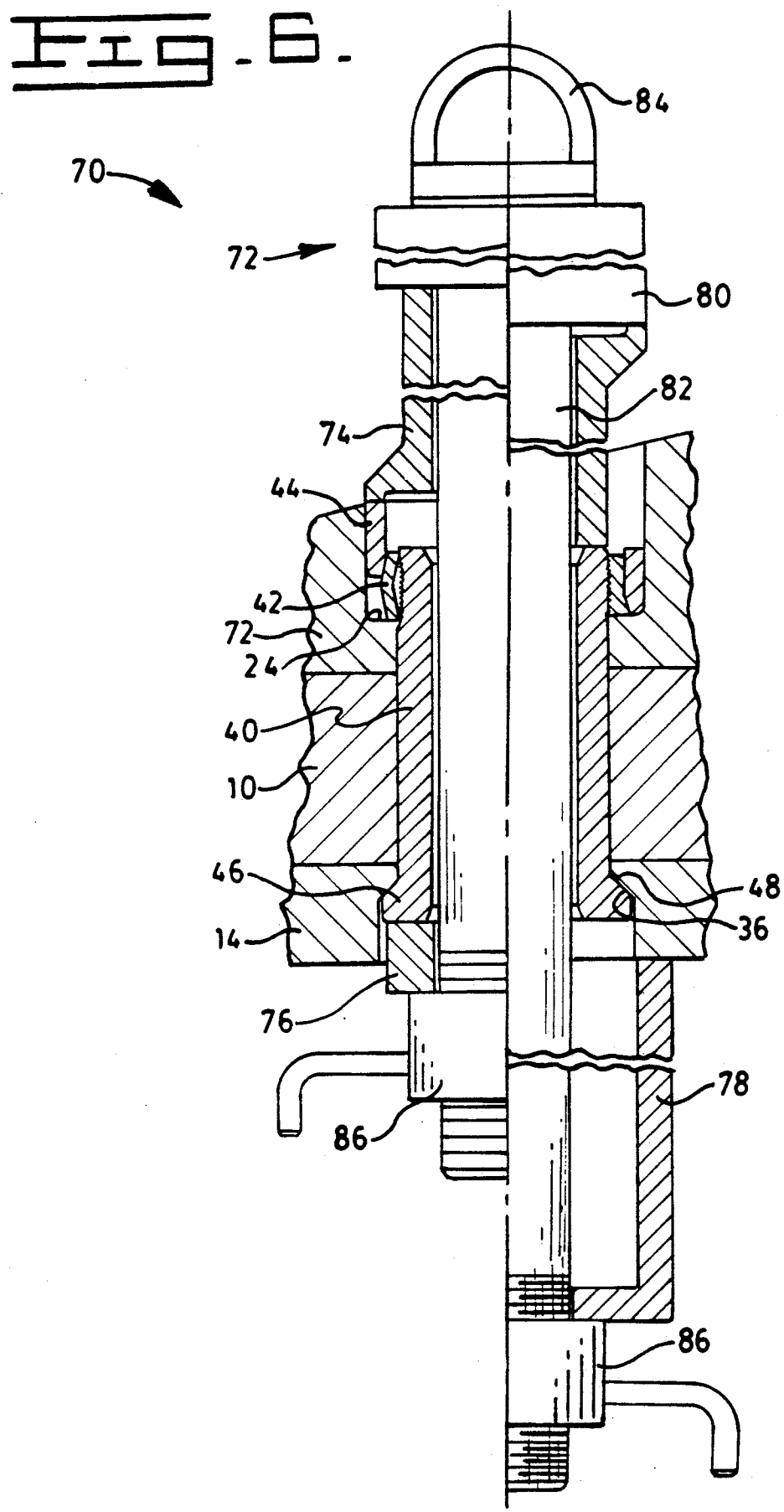
FIG. 6 is a partial sectional view similar to portions of FIG. 2 and further illustrating one type of service tool utilized to assemble and disassemble the fastener assembly.

Even though the subject arrangement could be assembled in a shop area where presses are normally readily available, the above noted embodiments may also be readily assembled or disassembled on the job site. A hydraulic tool assembly 70 adapted for use to assemble and dissemble the fastener assemblies 16,18 is diagrammatically illustrated in FIG. 6. The hydraulic tool assembly 70 includes a hydraulic cylinder mechanism 72, a first sleeve 74, a second sleeve 76, and a third sleeve 78. The hydraulic cylinder mechanism 72 includes a hydraulic cylinder 80 having a piston therein (not shown), a rod 82 connected to the piston, a lifting eye 84, and a retaining nut 86. The hydraulic tool assembly 70, as illustrated, is shown in a split image. The left side of the view of FIG. 6 illustrate the position of the hydraulic tool assembly 70 and the components of one of the fastener assemblies 16,18 just prior to the application of an assembly force thereto and the right side thereof illustrating the position of the same components just prior to disassembly. The first sleeve 74 has an enlarged diameter at one end sufficient to mate with the hollow cylindrical compression ring 44 and the other end of the first sleeve 74 having a size sufficient to mate with the other end of the hollow cylindrical pin 40. The second sleeve 76 is of a size sufficient to mate with the enlarged end 46 of the hollow cylindrical pin 40 and the retaining nut 86. The third sleeve 78 is of the size at one end to mate with the retaining nut 86 and of the size at the other end to mate with the bottom, in the subject arrangement, of the wear plate 14 and large enough to receive the hollow cylindrical pin 40 as it is being forced out (disassembled). It should be recognized that various forms of sleeves could be used in this arrangement without departing from the essence of the invention. More specifically, the second and third sleeves 76,78 could be combined into a single sleeve.

The first and second half shells 54,56 of the hollow cylindrical shear ring 42 and the first and second half shells 63,64 of the hollow cylindrical compression ring 44 are not necessarily each exactly 180 degrees around their respective circumferences. When the respective half shells 54,56/63,64 are placed together, a space is provided between each half. This allows the respective pieces thereof to be in intimate contact with the component(s) it mates with regardless of manufacturing tolerances.

INDUSTRIAL APPLICABILITY

In use, one or more of the compression retained fastener assemblies 16,18 are used to secure two or more members together. In the embodiment illustrated in FIGS. 1 and 2, the first and second fastener assemblies 16,18 are used to secure the adapter 12 and the wear plate 14 to the base edge 10. This is accomplished by placing the adapter 12 on the top of the base edge 10 and the wear plate 14 on the bottom of the adapter 10 with the respective openings of the adapter 12, the wear plate 14, and the base edge 10 being in axial alignment. Then, the hollow cylindrical pin 40 is inserted through the opening 32 in the wear plate 14, the opening 28 in the base edge 10, and the opening 22 of the adapter 12 until the shoulder 48 of the enlarged portion 46 of the hollow cylindrical pin 40 contacts the shoulder 36 of the counterbored hole in wear plate 14. The first and second half shells 54,56 of the hollow cylindrical shear ring 42 are placed in the counterbore of the opening 20 around and in intimate contact with the plurality of ridges 50 and grooves 52 of the hollow cylindrical pin 40 and so that one end of the first and second half shells 54,56 are in abutment with the shoulder 24 of the adapter 12. Next, the two substantially half shells 63,64 of the hollow cylindrical compression ring 44 is inserted in the counterbore of the opening 20 to a position in which the beveled leading edge 68 of the hollow cylindrical compression ring 44 is in contact with a portion of the outer surface 62 of the first and second half shells 54,56.

Once the hollow cylindrical pin 40, the hollow cylindrical shear ring 42, and the hollow cylindrical compression ring 44 are in the position as previously described, the portable hydraulic tool assembly 70 is used to complete the assembly. This is accomplished by the first sleeve 74 being placed on the rod 82 with the small end of the first sleeve 74 abutting the hydraulic cylinder 80. The rod 82 is inserted through the hollow cylindrical pin 40, as illustrated in FIG. 6 so that the large end of the first sleeve 74 contacts the other end of the hollow cylindrical compression ring 44. The second sleeve 76 is placed around the rod 82 and positioned against the enlarged end 46 of the hollow cylindrical pin 40. The retaining nut 86 is threaded onto the rod 82 until it contacts the second sleeve 76. Upon the application of hydraulic fluid, from an external source (not shown), to the hydraulic cylinder 80 of the hydraulic tool assembly 70, the hollow cylindrical compression ring 44 is progressively forced around the hollow cylindrical shear ring 42 and progressively causes the softer material of the hollow cylindrical shear ring 42 to flow around the plurality of ridges 50 and into the plurality of grooves 52 until the hollow cylindrical compression ring 44 reaches the position at which the end thereof is in contact with the shoulder 24 of the adapter 12.

When it is desired to disassemble the first and second fastener assemblies 16,18, the same hydraulic tool assembly 70 is used. During disassembly, the first sleeve 74 is turned around and placed on the rod 82 so that the large end of the first sleeve 74 abuts the hydraulic cylinder 80 and upon inserting the rod 82 through the hollow cylindrical pin 40 the small end of the first sleeve 74 abuts the other end of the hollow cylindrical pin 40. The third sleeve 78 is placed on the rod 82 so that the large hollow end thereof abuts the bottom of the wear plate 14. The retaining nut 86 is threaded onto the rod 82 until it contacts the other end of the third sleeve 78. Upon the application of hydraulic fluid to the hydraulic cylinder 80, the hollow cylindrical pin 40 is forced to move downward as illustrated in the subject drawings. This movement causes the material of the hollow cylindrical shear ring 42 that is located in the grooves 52 of the hollow cylindrical pin 40 to be sheared thus allowing the hollow cylindrical pin 40 to be forced out the bottom into the third sleeve 78. Since the hollow cylindrical shear ring 42 and the hollow cylindrical compression ring 44 are composed of half shells, they may easily be removed once the hollow cylindrical pin 40 has been forced out.

During the assembly of the fastener assembly 16 of the subject embodiments, a tensile load is applied to the hollow cylindrical pin 40 thus ensuring a more positive connection between the elements being assembled. Referring to FIG. 3, as the beveled leading edge 68 of the hollow cylindrical compression ring 44 is forced around the hollow cylindrical shear ring 42, the portion of the hollow cylindrical shear ring directly adjacent the beveled trailing edge 60 is forced to flow around a portion of the plurality of ridges 50 adjacent the other end of the hollow cylindrical pin 40. As the hollow cylindrical compression ring 44 is forced further over the hollow cylindrical shear ring 42 other portions of the hollow cylindrical shear ring 42 along the inner surface 58 thereof is forced to flow around yet others of the ridges 50 and into the grooves 52 of the plurality of ridges 50 and grooves 52. Since the first portion of the hollow cylindrical ring 42 adjacent the beveled trailing edge 60 thereof is already embedded around the first portion of the ridges 50 and into the first portion of the grooves 52, the chevron shape of the hollow cylindrical shear ring as it is being flattened attempts to make the hollow cylindrical pin 40 longer. Since one end of the hollow cylindrical shear ring 42 is in contact with the shoulder 24 of the adapter 12, its movement in that direction is prohibited. Consequently, the only direction that any portion of the hollow cylindrical shear ring 42 can attempt to move is in an upward direction as viewed in the drawing. This upward movement of the initial portion of the hollow cylindrical shear ring 42, caused by the chevron shape being flattened, induces tension into the hollow cylindrical pin 40 since the upward movement of the initial portion of the hollow cylindrical shear ring 42 is simultaneously attempting to stretch the hollow cylindrical pin 40. The stretching of the hollow cylindrical pin 40 induces a tensile load therein trying to pull the hollow cylindrical pin 40 back to its original length. This tensile load in the hollow cylindrical pin 40 compresses the adapter 12 and the wear plate 14 against the base edge 10.

Assembly of the subject arrangement requires forces in the range of approximately 54,500 kg to 136,200 kg (120,000 to 300,000 pounds). In order to keep the assembly forces as low as possible, it is beneficial to lubricate the pieces of the fastener assembly 16 with an anti-seize compound prior to assembly. Two examples of an anti-seize lubricant are Never-Seez produced by Never-Seez Compound Corp. located in Broadview, Ill. and Fel-Pro C5-A produced by Fel-Pro Incorporated located in Skokie, Ill. It is recognized that other types or brands of anti-seize lubricant could be used. The lubricant not only aids in the assembly of the components but also helps to reduce corrosion between the dissimilar materials. Disassembly of the fastener assembly 16 requires forces in the range of 113,500 kg to 136,200 kg (250,000 to 300,000 pounds).

In one typical application, the hollow cylindrical pin 40 and the hollow cylindrical compression ring 44 are both made from a SAE 4140 alloy steel and heat treated to a hardness in the range of 40–44 on the Rockwell "C" scale. The material of the hollow cylindrical shear ring 42 is a SAE 6061 aluminum alloy with a hardness grade of T6. The subject aluminum alloy has a shear strength of 207 Mpa (30,000 psi), a tensile strength of 310 MPa (45,000 psi), and a yield strength of 276 MPa (40,000 psi).

As previously noted, the only difference in the arrangement of FIG. 5 is that the enlarged end 46 of the hollow cylindrical pin 40' does not fit into the counterbore and the hollow cylindrical compression ring 44' has a larger diameter since it does not fit into the counterbore and needs additional wall thickness to resist the forces encountered when it is pressed over the hollow cylindrical shear ring 42.

In the subject arrangement, a method is provided for applying a preload force to the fastener assembly 16 when fastening the two or more members 12,14,16 together. The steps are set forth hereinafter. The hollow cylindrical pin 40 having the enlarged portion 46 at one end and the plurality of circumferential ridges 50 and grooves 52 at the other end thereof is inserted through corresponding openings of the members being secured until the enlarged portion 46 abuts one of the members. The hollow cylindrical shear ring 42, having the cross-section taken parallel to the axis thereof of the chevron shape, is placed around the hollow cylindrical pin 40 to the position abutting another of the members being secured. The hollow cylindrical compression ring 44 having the inner surface 65 with the beveled leading edge 68 is positioned in contact with the chevron shaped hollow cylindrical shear ring 42. The enlarged end 46 of the hollow cylindrical pin 40 is held in intimate contact with the one member of the members being secured. The external force is applied to the hollow cylindrical compression ring 42 in opposition to the force holding the hollow cylindrical pin 40 in abutment with the one member. The hollow cylindrical compression ring 44 is progressively forced axially around the chevron shaped hollow cylindrical shear ring 42 to progressively force the material of the hollow cylindrical shear ring 42 radially around the ridges 50 and into the grooves 52 of the plurality of circumferential ridges 50 and grooves 52 of the hollow cylindrical pin 40 and to progressively flatten the chevron shaped hollow cylindrical shear ring 42 thus progressively tensioning the hollow cylindrical pin 40 responsive to the flattening of the chevron shaped hollow cylindrical shear ring 42.

In view of the foregoing, it is readily apparent that the structure of each of the fastener assemblies 16,18 provides a simple arrangement for securing two or more members 10,12,14 together while providing a high retaining force and in addition providing a preloaded tensile force to each of the fastener assemblies 16,18 thus maintaining a tighter connection between the members being secured together.

Other aspects, objects, and advantages of this invention can be obtained from a study of the drawings, the disclosure, and the appended claims.

I claim:

1. A fastener assembly adapted to secure an adapter to a base edge of a bucket, the fastener assembly, comprising:

a hollow cylindrical pin having an enlarged portion at one end and a plurality of circumferential ridges and grooves at the other end thereof each being longitudinally adjacent each other, the hollow cylindrical pin, when assembled, being disposed through respective holes in the base edge and the adapter;

a hollow cylindrical shear ring operative, when assembled, to fit around the circumferential ridges and grooves adjacent the other end of the hollow cylindrical pin; and a hollow cylindrical compression ring operative, during assembly, in response to an external axial force applied to the hollow cylindrical compression ring to radially compress the hollow cylindrical shear ring so that a portion of the material of the hollow cylindrical shear ring is forced to flow around the plurality of circumferential ridges and into the plurality of circumferential grooves.

2. The fastener assembly of claim 1 wherein the cross-section of the hollow cylindrical shear ring taken parallel to the axis thereof is chevron shaped.

3. The fastener assembly of claim 2 wherein the chevron shaped hollow cylindrical shear ring has an inner surface with a beveled trailing edge which when placed in an assembled position the beveled trailing edge is immediately adjacent the other end of the hollow cylindrical pin and in intimate proximity with a portion of the plurality of ridges and grooves.

4. The fastener assembly of claim 3 wherein the hollow cylindrical compression ring has an inner surface with a beveled leading edge which during assembly is placed in intimate contact with an outer surface of the chevron shaped hollow cylindrical shear ring and in response to the external force displaces the portion of the material of the shear ring around the plurality of circumferential ridges and into the plurality of circumferential grooves.

5. The fastener assembly of claim 4 wherein, during assembly, the hollow cylindrical pin is placed in tension in response to flattening of the chevron shaped hollow cylindrical shear ring.

6. The fastener assembly of claim 5 wherein the hollow cylindrical shear ring is composed of substantially two half shells.

7. The fastener assembly of claim 6 wherein the hollow cylindrical shear ring is made from a material that is less dense than the material of the hollow cylindrical pin.

8. The fastener assembly of claim 7 wherein the material of the hollow cylindrical shear ring is an aluminum alloy.

9. The fastener assembly of claim 8 for use in securing an adapter to a bucket, the adapter defines an opening counterbored to establish a shoulder, and the hollow cylindrical compression ring is composed of two half shells and disposed in the counterbore.

10. The fastener assembly of claim 8 wherein the force necessary to assemble the fastener assembly is in the range of 54,000 kg to 135,200 kg.

11. The fastener assembly of claim 10 wherein the force necessary to disassemble the fastener assembly is in the range of 113,000 kg to 135,200 kg.

12. A method for applying a preload force to a fastened assembly when fastening two or more members together, comprising the steps of:
inserting a hollow cylindrical pin having an enlarged portion at one end and a plurality of circumferential ridges and grooves at the other end thereof through corresponding openings of the members to be secured until the enlarged portion abuts one of the members;
placing a hollow cylindrical shear ring having a cross-section, taken parallel to the axis thereof, of a chevron shape around the hollow cylindrical pin to a position abutting another member of the members to be secured;
positioning a hollow cylindrical compression ring having an inner surface with a beveled leading edge in contact with the chevron shaped hollow cylindrical shear ring;
holding the hollow cylindrical pin in intimate contact with the one member of the members being secured;
applying an external axial force to the hollow cylindrical compression ring in opposition to the force holding the hollow cylindrical pin in abutment with the one member;
progressively forcing the hollow cylindrical compression ring around the chevron shaped hollow cylindrical shear ring to progressively force a portion of the material of the hollow cylindrical shear ring radially around the ridges and into the grooves of the hollow cylindrical pin and to progressively flatten the chevron shaped hollow cylindrical shear ring thus progressively tensioning the hollow cylindrical pin responsive to the flattening of the chevron shaped hollow cylindrical shear ring.

13. The method of applying a preload force of claim 12 wherein the hollow cylindrical shear ring has an inner surface with a trailing beveled edge which when placed in an assembled position the beveled trailing edge is immediately adjacent the other end of the hollow cylindrical pin and in intimate proximity with a portion of the plurality of ridges and grooves.

14. The fastener assembly of claim 13 wherein the elements of the fastener assembly are coated with an anti-seize lubricate prior to assembly.

* * * * *

UNITED STATES PATENT AND TRADEMARK OFFICE
CERTIFICATE OF CORRECTION

PATENT NO. : 5,110,244
DATED : May 5, 1992
INVENTOR(S) : James A. Garman

It is certified that error appears in the above-indentified patent and that said Letters Patent is hereby corrected as shown below:

On the Title page, item [54], insert "COMPRESSION RETAINED" before "FASTENER ASSEMBLY".

Claim 12, column 9, lines 15-16, delete "fastened" and insert therefor --fastener--.

Signed and Sealed this

Seventeenth Day of August, 1993

Attest:

BRUCE LEHMAN

Attesting Officer

Commissioner of Patents and Trademarks